US012677210B2

(12) United States Patent
Niemi et al.

(10) Patent No.: US 12,677,210 B2
(45) Date of Patent: Jul. 7, 2026

(54) ADJUSTED PLMN SEARCH IN MICO MODE

(71) Applicant: MediaTek Singapore Pte. Ltd., Singapore (SG)

(72) Inventors: Marko Niemi, Oulu (FI); Puneet Puneet, Bengaluru (IN)

( * ) Notice: Subject to any disclaimer, the term of this patent is extended or adjusted under 35 U.S.C. 154(b) by 0 days.

(21) Appl. No.: 18/399,673

(22) Filed: Dec. 28, 2023

(65) Prior Publication Data

US 2024/0172100 A1 May 23, 2024

Related U.S. Application Data

(63) Continuation of application No. 17/475,540, filed on Sep. 15, 2021, now Pat. No. 11,902,885.

(30) Foreign Application Priority Data

Sep. 21, 2020 (IN) .............................. 202021040839

(51) Int. Cl.
$H04W\ 48/16$ (2009.01)
$H04W\ 84/04$ (2009.01)

(52) U.S. Cl.
CPC .......... *H04W 48/16* (2013.01); *H04W 84/042* (2013.01)

(58) Field of Classification Search
CPC .... H04W 48/16; H04W 84/042; H04W 24/02
See application file for complete search history.

(56) References Cited

U.S. PATENT DOCUMENTS

2019/0037516 A1 1/2019 Kim et al.
2022/0095209 A1* 3/2022 Niemi ................... H04W 48/16

OTHER PUBLICATIONS

Taiwan Intellectual Property Office, Office Action for Taiwan Patent Application No. 110134722, Apr. 7, 2022.
3Gpp, "3rd Generation Partnership Project; Technical Specification Group Radio Access Network; NR; User Equipment (UE) procedures in Idle mode and RRC Inactive state (Release 16)," Jul. 2020, 3GPP TS 38.304, V16.1.0.
3Gpp, "3rd Generation Partnership Project; Technical Specification Group Core Network and Terminals; Non-Access Stratum (NAS) protocol for 5G System (5GS); Stage 3; (Release 16)," 3GPP, Jul. 2020, 3GPP TS 24.501, V16.5.1.

* cited by examiner

*Primary Examiner* — Diane D Mizrahi
(74) *Attorney, Agent, or Firm* — Andy M. Han; Han IP PLLC

(57) ABSTRACT

Solutions pertaining to adjusted public land mobile network (PLMN) search in mobile initiated connection only (MICO) mode in mobile communications are proposed. An apparatus implemented in a UE activates a MICO mode. The apparatus then postpones a periodic PLMN search in response to the UE being in the MICO mode, with the periodic PLMN search being controlled by a timer.

15 Claims, 3 Drawing Sheets

ACTIVATE, BY A PROCESSOR OF A USER EQUIPMENT (UE), A MOBILE INITIATED CONNECTION ONLY (MICO) MODE
310

POSTPONE, BY THE PROCESSOR, A PERIODIC PUBLIC LAND MOBILE NETWORK (PLMN) SEARCH, WHICH IS CONTROLLED BY A TIMER, RESPONSIVE TO THE UE BEING IN THE MICO MODE
320

100

WIRELESS NETWORK
120

125

110

UE 110 PERFORMS ADJUSTED PUBLIC LAND MOBILE
NETWORK (PLMN) SEARCH WHEN IN A MOBILE
INITIATED CONNECTION ONLY (MICO) MODE

300

ACTIVATE, BY A PROCESSOR OF A USER EQUIPMENT (UE), A
MOBILE INITIATED CONNECTION ONLY (MICO) MODE
310

POSTPONE, BY THE PROCESSOR, A PERIODIC PUBLIC LAND
MOBILE NETWORK (PLMN) SEARCH, WHICH IS CONTROLLED BY
A TIMER, RESPONSIVE TO THE UE BEING IN THE MICO MODE
320

ADJUSTED PLMN SEARCH IN MICO MODE

CROSS REFERENCE TO RELATED PATENT APPLICATION(S)

The present disclosure is part of a continuation of U.S. patent application Ser. No. 17/475,540, filed 15 Sep. 2021 and claiming the priority benefit of India Patent Application No. 202021040839, filed 21 Sep. 2020. Contents of the aforementioned applications are herein incorporated by reference in their entirety.

TECHNICAL FIELD

The present disclosure is generally related to mobile communications and, more particularly, to adjusted public land mobile network (PLMN) search in mobile initiated connection only (MICO) mode in mobile communications.

BACKGROUND

Unless otherwise indicated herein, approaches described in this section are not prior art to the claims listed below and are not admitted as prior art by inclusion in this section.

In wireless communications such as mobile communications according to the 3rd Generation Partnership Project (3GPP) specifications, a user equipment (UE) is registered but there is no cell available when in the MICO mode. More specifically, when in the MICO mode, mobile originated data is supported from CM-CONNECTED or CM-IDLE state and mobile terminated data is only supported when the UE is in CM-CONNECTED state. The UE may indicate its preference for MICO mode to a network during an Initial Registration procedure or a Mobility Registration Update procedure. The network may indicate whether the MICO mode is allowed for the UE during a Registration procedure. The UE and an Access and Mobility Management Function (AMF) of the network may activate the MICO mode to optimize power efficiency and signaling efficiency of the UE, which are the most important factors in the MICO mode. When the MICO mode is activated the UE should remain in that mode (e.g., being inactive and access stratum (AS) layer deactivated) as far as possible.

If and when the UE is in a visited PLMN (VPLMN), regardless of whether the MICO mode is activated, the UE is to periodically search for potential higher-priority PLMN(s). However, periodic PLMN search is controlled by a timer T and the value of the timer T is stored in the UE (e.g., in a Universal Subscriber Identity Module (USIM) in the UE) or has a default value of 60 minutes. Moreover, deactivating the MICO mode for performing periodic PLMN searches, while otherwise the UE would not deactivate it, would cause unnecessary power consumption. Therefore, there is a need for a solution of PLMN search in the MICO mode.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, designs, concepts, techniques, methods, systems and apparatus to address aforementioned issues. Specifically, various proposed schemes in accordance with the present disclosure pertain to adjusted PLMN search in MICO mode in mobile communications.

In one aspect, a method may involve a UE activating a MICO mode. The method may also involve the UE postponing a periodic PLMN search responsive to the UE being in the MICO mode, with the periodic PLMN search being controlled by a timer.

In another aspect, an apparatus implementable in a UE may include a configured to communicate wirelessly. The apparatus may also include a processor coupled to the transceiver. The processor may activate a MICO mode. The processor may postpone a periodic PLMN search responsive to the UE being in the MICO mode, with the periodic PLMN search being controlled by a timer.

It is noteworthy that, although description provided herein may be in the context of certain radio access technologies, networks and network topologies such as 5th Generation (5G) New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), Industrial Internet of Things (IIoT) and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to adjusted PLMN search in MICO mode in mobile communications. According to the present disclosure, a number of possible solutions may be implemented separately or jointly. That is, although these possible solutions may be described below separately, two or more of these possible solutions may be implemented in one combination or another.

Figure 1:
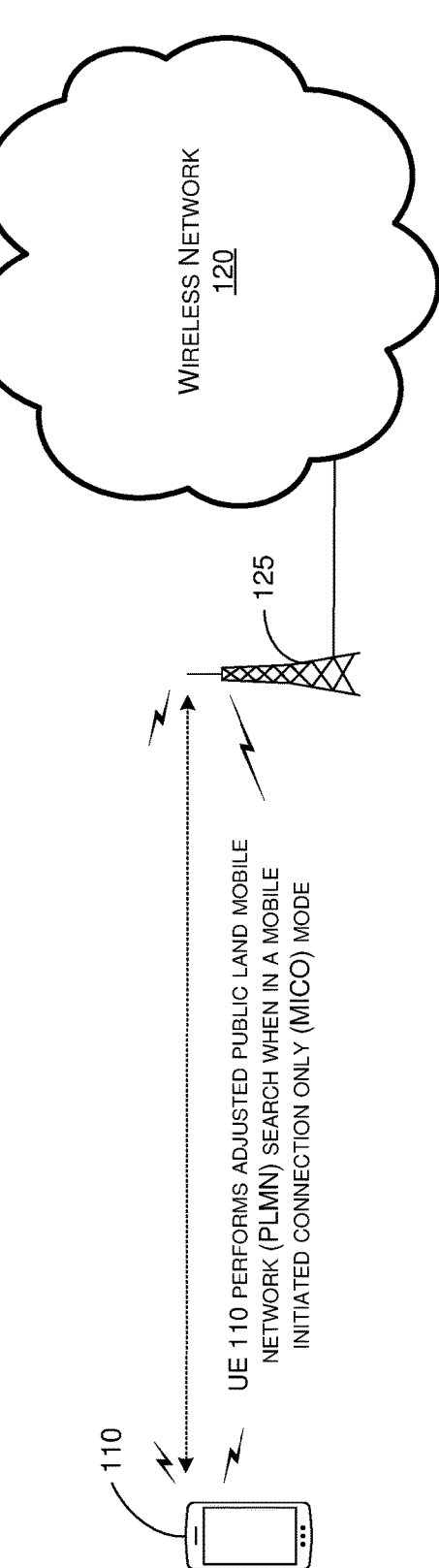
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network) as part of a communication network. UE 110 may initially be in wireless communication with wireless network 120 via a base station or network node 125 (e.g., an eNB, gNB or transmit-receive point (TRP)). In network environment 100, UE 110 and network 120 may implement various schemes pertaining to adjusted PLMN search in MICO mode in mobile communications in accordance with the present disclosure, as described below.

Under a first proposed scheme in accordance with the present disclosure with respect to adjusted PLMN search in MICO mode, UE 110 may stop a timer T when the MICO mode is activated in UE 110. Moreover, UE 110 may attempt to perform PLMN search again when the MICO mode is deactivated, and UE 110 may start the timer T after that attempt.

Under a second proposed scheme in accordance with the present disclosure with respect to adjusted PLMN search in MICO mode, even when timer T (used for periodic PLMN search) is kept running in UE 110 while the MICO mode is activated, UE 110 may not need to perform periodic attempt at time T after a previous attempt. On the other hand, UE 110 may be allowed to further postpone the periodic PLMN search.

Under a third proposed scheme in accordance with the present disclosure with respect to adjusted PLMN search in MICO mode, UE 110 may interpret a stored value of timer T in a specific manner to ensure an extended period between every two adjacent periodic PLMN searches when the MICO mode is activated. This may be achieved, for example, by interpreting the value of the timer T in terms of a number of hour steps. For instance, in an event that the value of timer T is "4" and x=2, then the period between every two adjacent periodic PLMN searches may be 4×2=8 hours. The step/factor for timer T value may be pre-configured by an operator or a manufacturer of UE 110 and stored in a memory or storage device of UE 110 or a Universal Subscriber Identity Module (USIM) used in UE 110 or a particular 3GPP standardized factor.

Under a fourth proposed scheme in accordance with the present disclosure with respect to adjusted PLMN search in MICO mode, UE 110 may be configured with a separate periodic PLMN search timer, which is different from timer T, to be used when the MICO mode is activated in UE 110.

Illustrative Implementations

Figure 2:
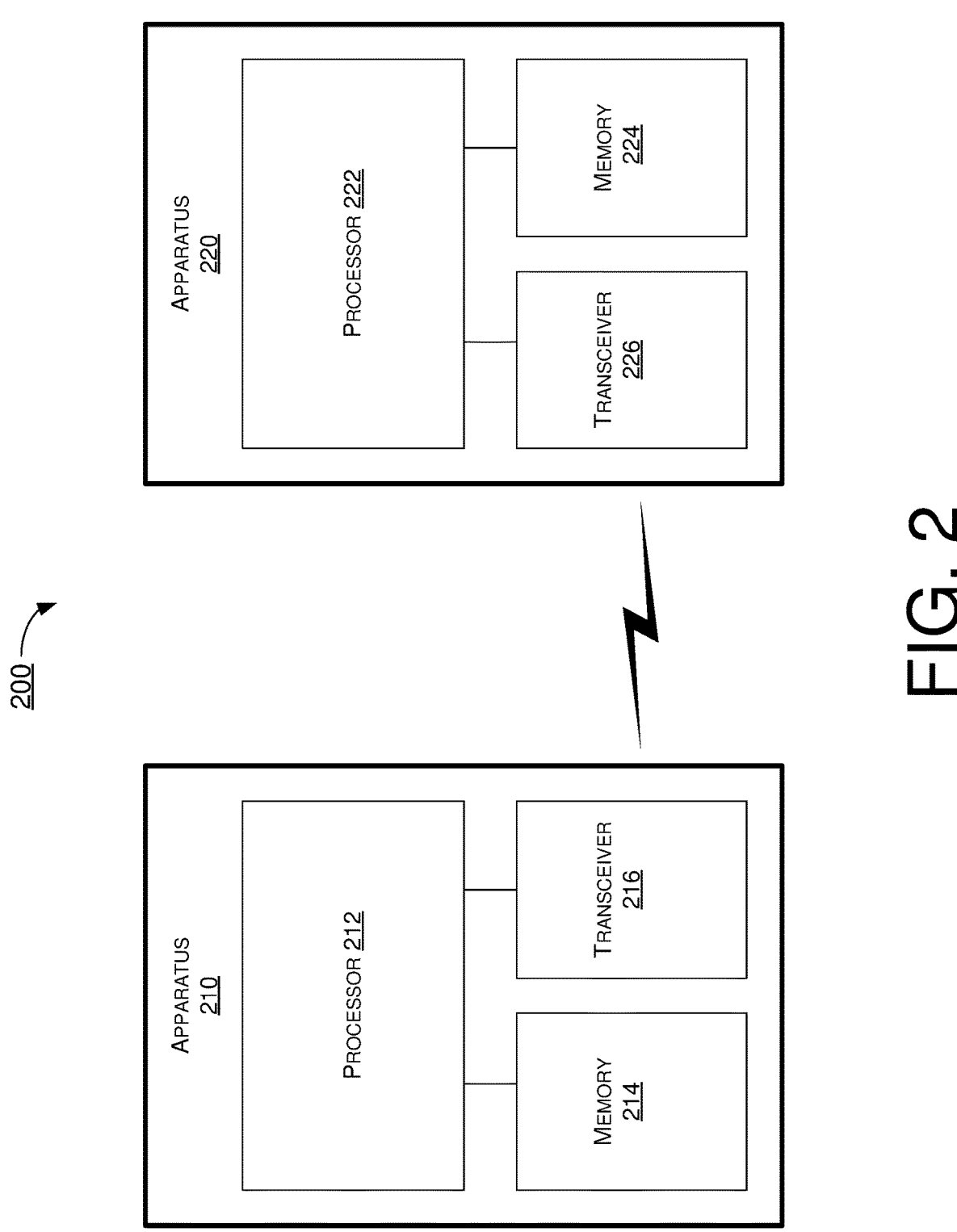
FIG. 2 is a block diagram of an example communication system in accordance with an implementation of the present disclosure.

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to adjusted PLMN search in MICO mode in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to adjusted PLMN search in MICO mode in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., network node 125) of a wireless network (e.g., network 120 as a 5G/NR mobile network), is provided below.

Under various proposed schemes in accordance with the present disclosure pertaining to adjusted PLMN search in MICO mode in mobile communications, processor 212 of apparatus 210, implemented in or as UE 110, may activate a MICO mode. Moreover, processor 212 may postpone, via transceiver 216, a periodic PLMN search responsive to apparatus 210 being in the MICO mode. In some implementations, the periodic PLMN search may be controlled by a timer.

In some implementations, in postponing the periodic PLMN search, processor 212 may perform certain operations. For instance, processor 212 may allow the timer to keep running. Additionally, processor 212 may postpone the periodic PLMN search upon expiry of the timer when the MICO mode is activated.

In some implementations, processor 212 may perform additional operations. For instance, processor 212 may deactivate the MICO mode. Moreover, processor 212 may perform, via transceiver 216, the periodic PLMN search responsive to the MICO mode being deactivated.

In some implementations, a value of the timer may be stored in apparatus 210 and has a default value of 60 minutes.

In some implementations, in postponing the periodic PLMN search, processor 212 may stop the timer until the MICO mode is deactivated. In some implementations, processor 212 may perform additional operations. For instance, processor 212 may deactivate the MICO mode. Moreover, processor 212 may perform the periodic PLMN search responsive to the MICO mode being deactivated.

In some implementations, in postponing the periodic PLMN search, processor 212 may interpret a value of the timer in a way that extends a duration between two adjacent periodic PLMN searches when the MICO mode is activated. In some implementations, in interpreting of the value of the timer, processor 212 may multiply the value of the timer with a factor which is in units of hours. In some implementations, the factor may be preconfigured and stored in the UE.

In some implementations, in postponing the periodic PLMN search, processor 212 may utilize another timer, which is different than the timer, to control the periodic PLMN search when the MICO mode is activated.

Illustrative Processes

Figure 3:
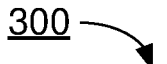
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including those pertaining to those described above. More specifically, process 300 may represent an aspect of the proposed concepts and schemes pertaining to adjusted PLMN search in MICO mode in mobile communications. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., network node 125) of a wireless network (e.g., wireless network 120). Process 300 may begin at block 310.

At 310, process 300 may involve processor 212 of apparatus 210 activating a MICO mode. Process 300 may proceed from 310 to 320.

At 320, process 300 may involve processor 212 postponing, via transceiver 216, a periodic PLMN search responsive to apparatus 210 being in the MICO mode. In some implementations, the periodic PLMN search may be controlled by a timer.

In some implementations, in postponing the periodic PLMN search, process 300 may involve processor 212 performing certain operations. For instance, process 300 may involve processor 212 allowing the timer to keep running. Additionally, process 300 may involve processor 212 postponing the periodic PLMN search upon expiry of the timer when the MICO mode is activated.

In some implementations, process 300 may involve processor 212 performing additional operations. For instance, process 300 may involve processor 212 deactivating the MICO mode. Moreover, process 300 may involve processor 212 performing, via transceiver 216, the periodic PLMN search responsive to the MICO mode being deactivated.

In some implementations, a value of the timer may be stored in apparatus 210 and has a default value of 60 minutes.

In some implementations, in postponing the periodic PLMN search, process 300 may involve processor 212 stopping the timer until the MICO mode is deactivated. In some implementations, process 300 may involve processor 212 performing additional operations. For instance, process 300 may involve processor 212 deactivating the MICO mode. Moreover, process 300 may involve processor 212 performing the periodic PLMN search responsive to the MICO mode being deactivated.

In some implementations, in postponing the periodic PLMN search, process 300 may involve processor 212 interpreting a value of the timer in a way that extends a duration between two adjacent periodic PLMN searches when the MICO mode is activated. In some implementations, in interpreting of the value of the timer, process 300 may involve processor 212 multiplying the value of the timer with a factor which is in units of hours. In some implementations, the factor may be preconfigured and stored in the UE.

In some implementations, in postponing the periodic PLMN search, process 300 may involve processor 212 utilizing another timer, which is different than the timer, to control the periodic PLMN search when the MICO mode is activated.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

activating, by a processor of a user equipment (UE), a Mobile Initiated Connection Only (MICO) mode;

responsive to being in the MICO mode, performing, by the processor, adjusted periodic public land mobile network (PLMN) searches in the MICO mode, by adjusting a duration between two adjacent periodic PLMN searches or adjusting a frequency of one or more of the adjacent periodic PLMN searches, by postponing a periodic PLMN search; and allowing a timer controlling the periodic PLMN searches to keep running.

2. The method of claim 1, wherein the postponing of the periodic PLMN search comprises:

allowing the timer to keep running; and postponing the periodic PLMN search upon expiry of the timer when the MICO mode is activated.

3. The method of claim 1, wherein a value of the timer is stored in the UE and has a default value of 60 minutes.

4. The method of claim 1, wherein the postponing of the periodic PLMN search comprises stopping the timer until the MICO mode is deactivated.

5. The method of claim 4, further comprising:

deactivating, by the processor, the MICO mode; and performing, by the processor, the periodic PLMN search responsive to the MICO mode being deactivated.

6. The method of claim 1, wherein the postponing of the periodic PLMN search comprises interpreting a value of the timer in a way that extends the duration between the two adjacent periodic PLMN searches when the MICO mode is activated.

7. The method of claim 6, wherein the interpreting of the value of the timer comprises multiplying the value of the timer with a factor which is in units of hours.

8. The method of claim 7, wherein the factor is preconfigured and stored in the UE.

9. The method of claim 1, wherein the postponing of the periodic PLMN search comprises utilizing another timer, which is different than the timer, to control the periodic PLMN search when the MICO mode is activated.

10. An apparatus implementable in a user equipment (UE), comprising:

a transceiver configured to communicate wirelessly; and a processor coupled to the transceiver and configured to perform operations comprising:

activating a Mobile Initiated Connection Only (MICO) mode;

responsive to being in the MICO mode, performing adjusted periodic public land mobile network (PLMN) searches in the MICO mode, by adjusting a duration between two adjacent periodic PLMN searches or adjusting a frequency of one or more of the adjacent periodic PLMN searches, by postponing a periodic PLMN search; and allowing a timer controlling the periodic PLMN searches to keep running.

11. The apparatus of claim 10, wherein, in postponing the periodic PLMN search, the processor is configured to perform operations comprising:

postponing the periodic PLMN search upon expiry of the timer when the MIMO mode is activated.

12. The apparatus of claim 10, wherein the processor is further configured to perform operations comprising:

deactivating, by the processor, the MICO mode; and performing, by the processor, the periodic PLMN search responsive to the MICO mode being deactivated.

13. The apparatus of claim 10, wherein, in postponing the periodic PLMN search, the processor is configured to stop the timer until the MICO mode is deactivated.

14. The apparatus of claim 10, wherein, in postponing the periodic PLMN search, the processor is configured to interpret a value of the timer in a way that extends the duration between the two adjacent periodic PLMN searches when the MICO mode is activated.

15. The apparatus of claim 14, wherein, in interpreting the value of the timer, the processor is configured to multiply the value of the timer with a factor which is in units of hours.

* * * * *